July 8, 1941.                F. J. LIBBEY                2,248,537
                            ANTISKID DEVICE
                          Filed July 17, 1940
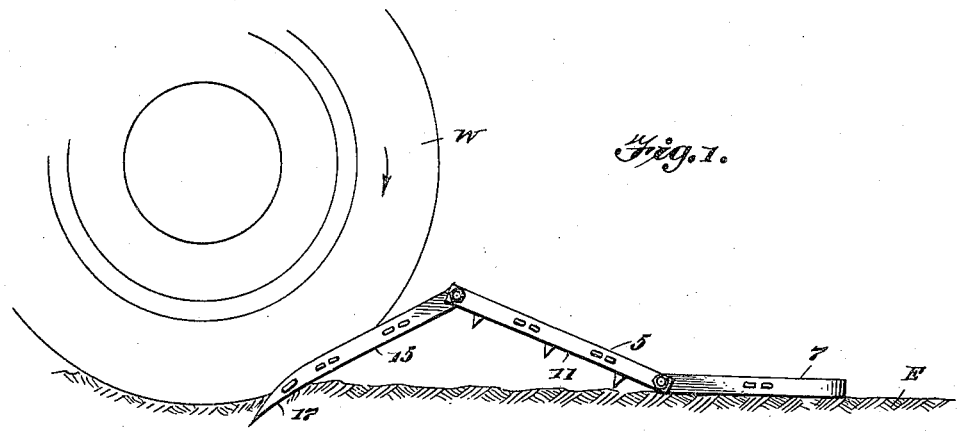
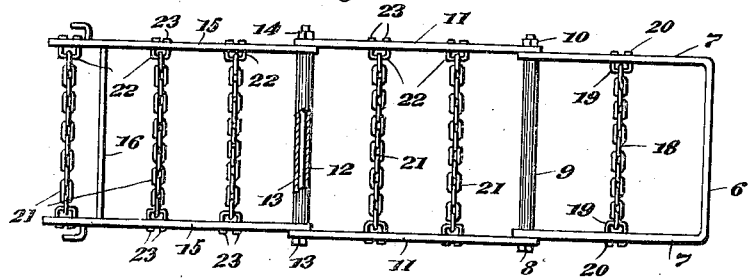
Inventor
FAY JACKSON LIBBEY
By L. Edw'd Doherty
Attorney Patented July 8, 1941

2,248,537

UNITED STATES PATENT OFFICE 2,248,537

ANTISKID DEVICE

Fay Jackson Libbey, Albany, N. Y.

Application July 17, 1940, Serial No. 346,010

3 Claims. (Cl. 238—14)

This invention relates to improvements in antiskid devices for motor vehicles.

The primary object of the invention is to provide an antiskid device which may be positioned under the rear wheels of the vehicle whereby said vehicle may gain traction and be driven out of snow, mud and ruts in the roadway.

A further object of the invention is to provide an antiskid and traction increasing device which may be placed under the rear wheels of a motor vehicle when the same becomes stuck in mud, snow and ice and which may be folded into a compact unit for storing in a compartment in the motor vehicle when not in use.

A still further object of this invention is to provide a device of the above mentioned character including parallel folding side bars having transverse traction elements for preventing skidding of the rear wheels of a motor vehicle after the device has been placed in position.

A still further object of the invention is to provide a device of the above mentioned character in which the forward portions of the parallel side folding bars are pointed to anchor the device against longitudinal movement.

Other objects and advantages of the invention will become apparent during the course of the following description taken in consideration with the drawing, wherein, Figure 1 is a side elevational view of the antiskid device illustrating the same in an operative position, Figure 2 is a side elevational view of the device illustrating the same in a fully extended position, Figure 3 is a top elevational view of the antiskid device showing the transverse traction increasing members mounted between the parallel side frame bars, and, Figure 4 is a top plan fragmentary view partly in section illustrating the manner in which skid chains may be applied to the wheels of motor vehicles with the aid of the device.

In the drawing, wherein for the purpose of illustrating the invention and wherein like reference characters will be employed to designate like parts throughout the same, the reference character 5 will be employed to generally designate a traction increasing member comprising a U-shaped end frame member 6, the leg portions of which, as at 7, extend parallel and are provided with openings in the ends thereof for receiving a transverse bolt and extending through a hollow spacing rod and anchored in place by means of a nut 10 threaded on the free end of the rod.

Interposed between the head of the bolt 8 and the nut 10 and the free ends of the U-shaped frame 6 are parallel intermediate side frame members 11, the opposite ends of which are connected to a hollow spacing rod 12 similar to the spacing rod 9 by means of a transverse bolt 13 fastened in place by a nut 14 threaded on the free end thereof.

Pivotally mounted between the free ends of the side frame members 11 and the hollow spacing rod 12 are end frame members 15 the free ends of which are spaced by means of a cross rod 16 and terminate in downwardly curved pointed portions 17 adapted to enter the earth E, when the traction device is positioned in front of one of the rear wheels W of a motor vehicle.

A transverse traction chain 18 extends between the U-shaped frame member 6 and said chain has its ends secured to a clevis anchored in place by bending the free ends of the clevis, as at 20.

Similarly, the intermediate and end frame members are provided with transverse traction increasing chains 21, the ends of which are anchored in place by means of clevises 22 fastened to the side frame members by bending over the projecting ends 23.

The underside of the U-shaped frame member 6 and the intermediate frame members 11 are provided with spikes 24 and 25, respectively, to engage the surface upon which the device is placed and prevent slippage of the antiskid device.

When it is desired to place conventional skid chains on the wheels W of the vehicle, the device may be positioned as shown in Figure 1 so that the end links 26 of a tire chain 27 may be fastened to hooks 28 anchored in the downwardly curved pointed portions 17 of the side frame members 15. After the tire chain 27 is placed so that the chain lies in front of the wheel, the motor vehicle may be advanced until the ends of the tire chain meet. The links 26 may then be removed and fastened by the conventional tire chain hooks.

It is to be understood that the device may be folded on the pivot bolts 8 and 13 and the section 6 is first folded over the intermediate section 11 and the end section comprising the side frame members 15 are folded under the intermediate section. When the antiskid device is in its folded position and not in use it can be stored in the trunk compartment of the motor vehicle or any other convenient location.

It is also to be understood that the form of the invention herewith shown and described is to be taken as a preferred embodiment of the same and that various changes in the shape, size and arrangement of parts may be resorted to without departing from the spirit of the invention or the scope of the subjoined claims.

What is claimed is:

1. A traction device of the class described, comprising an intermediate frame section, end frame sections pivotally connected to the intermediate frame sections, each section including longitudinal side members secured together having spacing means therebetween, ground engaging spikes carried by the intermediate and one of the end frame sections, the other end frame section having its free ends pointed and curved downwardly for engaging the ground and transverse traction chains extending across each frame section.

2. A traction device of the class described comprising an intermediate frame section, including longitudinal side members secured together, a substantially U-shaped end frame section pivotally connected to one end of the intermediate frame section, another end frame section including longitudinal side members secured together pivotally connected to the free end of the intermediate section, the free ends of the last named end section being pointed and curved downwardly for engaging the ground, spacing means disposed between the longitudinal side members of the sections and transverse traction chains extending across each frame section.

3. A traction device of the class described, comprising an intermediate frame section, including longitudinal side members secured together, a substantially U-shaped end frame section pivotally connected to one end of the intermediate frame section, another end frame section including longitudinal side members secured together pivotally connected to the free end of the intermediate section, the free ends of the last named end section being pointed and curved downwardly for engaging the ground, spacing means disposed between the longitudinal side members of the sections, transverse traction chains extending across each frame section, ground engaging sprags on the longitudinal side members of the intermediate section and the U-shaped end frame section, and hooks on the outer sides of the longitudinal side members of the end frame section adjacent the pointed end thereof.

FAY JACKSON LIBBEY.